United States Patent Office 3,235,625
Patented Feb. 15, 1966

3,235,625
MIXTURES OF AN OLEFIN COPOLYMER OF ETHYLENE-PROPYLENE AND ETHYLENE-BUTENE VULCANIZABLE WITH AN ORGANIC PEROXIDE AND OF AN UNSATURATED POLYESTER, AND ELASTOMERS OBTAINED THEREFROM
Giuliano Ballini and Augusto Portolani, both of Ferrara, Italy, assignors to Montecatini Società Generale per l'Industria Mineraria e Chimica, Milan, Italy, a corporation of Italy
No Drawing. Filed Apr. 20, 1962, Ser. No. 188,988
Claims priority, application Italy Apr. 24, 1961, 7,658/61
12 Claims. (Cl. 260—873)

The present invention relates to the preparation of mixtures of a copolymer of ethylene with alpha-olefins such as propylene and/or butene, which copolymer is vulcanizable with an organic peroxide and an unsaturated polyester, and to vulcanized elastomers obtained therefrom.

It is known that in those saturated elastomers which are vulcanizable with organic peroxides, the use of auxiliary substances such as plasticizers, extenders, fillers, resins, etc., is limited, due to the fact that such substances can easily react with organic peroxides and thereby act as vulcanization inhibitors.

The above is particularly true as regards plasticizers. Thus, a plasticizer, which is typically a relatively unsaturated hydrocarbon oil or an ester, will considerably lower the degree of cross-linking in products which are vulcanized with organic peroxides.

We have found, and this is the main feature of the present invention, that liquid polyesters obtained by well-known methods of condensation of unsaturated dicarboxylic acids with organic compounds containing two or more esterifiable hydroxyls, exert a high plasticizing action on ethylene-alpha olefin copolymers, more particularly on ethylene-propylene and ethylene-butene copolymers, and yet when such plasticizers are co-vulcanized with such copolymers there is no inhibition of the degree of cross-linking.

Moreover, the unsaturated polyesters of our invention also have the capacity of exerting a lubricating action during the extrusion of the crude mixture, thus considerably improving the extrudability of the mixture.

It has been found that, in order to obtain the benefits of all these effects, namely, plasticization, co-vulcanization and lubrication, from a single substance, this substance must be in the liquid or semi-liquid state under the processing conditions of the mixture and must contain double bonds of the "maleic" type, partly esterified, along with some free carboxylic and hydroxyl groups, which groups impart certain polarity to the mixture.

Appropriate substances which function as plasticizers, lubricants and covulcanizing agents comprise polyesters obtained by condensation by well-known methods of unsaturated dicarboxylic acids such as, e.g., maleic, dichloromaleic, fumaric, muconic, citraconic, mesaconic, itaconic, methylenemalonic acids, etc., with compounds containing two or more hydroxyls, such as ethylene glycol, diethylene glycol, polyoxyethylene glycol, trimethylene glycol, neopentylene glycol, propylene glycol, butylene glycol, glycerol, etc.

The polyester may be made by condensing two different unsaturated dicarboxylic acids with the hydroxyl-containing compound. Also, the polyester may contain, in addition to the unsaturated dicarboxylic acid, a saturated dicarboxylic acid.

The degree of polymerization of the polyesters described above and their structure may vary within rather wide limits, and the properties of such polyesters as plasticizers, lubricants, and covulcanizing agents are all maintained, provided that the polyesters are fluid at the working temperatures of the mixtures. This is generally obtained by using polyesters which have a softening point lower than 180° C.

Although the combination of plasticizing, lubricating, and covulcanizing actions is an unusual characteristic of these unsaturated polyesters and is the main feature of our invention, there is also another singular effect exerted

TABLE I

| Example Number | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Ethylene-propylene copolymer [a] | 100 | 100 | 100 | 100 | | 100 | 100 | 100 | 100 | | 100 | 100 | 100 | 100 | 100 | 100 | 100 |
| Ethylene-butene copolymer [b] | | | | | 100 | | | | | 100 | | | | | | | |
| Carbon black HAF | 50 | | | | 50 | 50 | | | | 50 | 50 | | | 50 | | | |
| Carbon black EPC | | 50 | | | | | 50 | | | | | | | | | | |
| Silica (Hisil) | | | 50 | | | | | 50 | | | | 50 | | | | | |
| Clay (Whitetex) | | | | 100 | | | | | 100 | | | | 100 | | 100 | 100 | 100 |
| Polyester [c] | | | | | | 5 | 5 | 5 | 5 | 5 | | | | | | | |
| Polyester [d] | | | | | | | | | | | 10 | 10 | 10 | | | | |
| Polyester [e] | | | | | | | | | | | | | | 5 | 5 | | |
| Polyester [f] | | | | | | | | | | | | | | | | 5 | |
| Polyester [g] | | | | | | | | | | | | | | | | | 5 |
| Sulfur* | 0.3 | 0.3 | 0.4 | 0.4 | 0.3 | 0.3 | 0.3 | 0.4 | 0.4 | 0.3 | 0.3 | 0.4 | 0.4 | 0.3 | 0.4 | 0.4 | 0.4 |
| α, α'-bis (tertiary butyl peroxy) p-diisopropyl benzene | 1.63 | | | 2.6 | 1.63 | 1.63 | | | | 1.63 | | | 2.06 | | | | |
| Dicumyl peroxide | | 3.3 | 3.3 | | | | 3.3 | 3.3 | 3.3 | | 3.3 | 3.3 | | 3.3 | 3.3 | 3.3 | 3.3 |
| Mooney viscosity, ML (1+4), 100° C | 103 | 100 | 163 | 98 | 110 | 68 | 64 | 149 | 69 | 80 | 65 | 135 | 62 | 73 | 66 | 63 | |
| Tensile properties of vulcanizates after heating at 165° C. for (minutes) | 40 | 30 | 30 | 40 | 40 | 40 | 30 | 30 | 30 | 40 | 30 | 30 | 40 | 30 | 30 | 30 | 30 |
| Tensile strength,[h] kg./cm.[2] | 189 | 158 | 173 | 44 | 200 | 167 | 169 | 132 | 85 | 198 | 195 | 154 | 75 | 181 | 66 | 74 | 61 |
| Elongation at break,[h] percent | 400 | 707 | 740 | 1,200 | 445 | 340 | 520 | 353 | 355 | 380 | 425 | 375 | 345 | 403 | 440 | 350 | 320 |
| Modulus at 300%,[h] kg./cm.[2] | 122 | 37 | 40 | 13 | 111 | 141 | 63 | 104 | 78 | 132 | 124 | 112 | 74 | 118 | 53 | 71 | 60 |
| Residual elongation at 200% [i] | 7 | 19 | 28 | 34 | 7 | 8 | 12 | 11.5 | 8 | 7.5 | 8 | 14 | 10 | 9.5 | 9.5 | 10.5 | 10 |

[a] Ethylene-propylene copolymer containing 45 mole percent of propylene and having a Mooney viscosity of 50 ML (1+4) 100° C.
[b] Ethylene-butene copolymer containing 30 mole percent of butene, and having a Mooney viscosity of 52 ML (1+4) 100° C.
[c] A polyester resin prepared by heating maleic anhydride (1 mole) and ethylene glycol (2 moles) at 195–200° C. for 6 hours and removing water and excess glycol by vacuum distillation.
[d] Polyester resin prepared by heating maleic anhydride (1 mole) and ethylene glycol (1 mole) at 200° C. for 8 hours.
[e] Polyester resin prepared by heating maleic anhydride (1 mole) and triethylene glycol (1 mole) at 200° C. for 8 hours.
[f] Polyester resin prepared by heating itaconic acid (1 mole) and ethylene glycol (1 mole) at 200° C. for 8 hours.
[g] Polyester resin prepared by heating maleic anhydride (1 mole) and glycerol (1 mole) at 165° for 3 hours.
[h] Determined on a type C specimen (ASTM D–412) obtained from plates of 120 x 120 x 2 mm., with an Amsler dynamometer, with a rate of separation of the grips of 500 mm./minute.
[i] Determined on specimens having a useful portion of 5 cm., kept under tension to an elongation of 200% for 1 hour and measured 1 minute after rest.
*Together with sulfur, or in substitution therefor, also quinonic compounds, as described in the Italian Patent 587,681 issued January 20, 1959, may be used. Preferably these compounds are selected for the group consisting of p-benzoquinone, p-quinone dioxime, O,O'-dibenzoyl-p-quinone dioxime, p-nitrosophenol in its tautomeric form, and the like.

by these polyesters on ethylene-propylene and ethylene-butene copolymers. Thus, we have surprisingly found, and this is a second feature of our invention, that the aforementioned polyesters have a considerable effectiveness in promoting the dispersion of fillers in the copolymer mixture and in promoting the interaction between filler and copolymer. This specifically results in a reinforcing of the filled vulcanizate. More particularly, mixtures of ethylene-propylene or ethylene-butene copolymers with siliceous fillers (clay or silica) which, as known, are hardly vulcanized with organic peroxides alone, are, in the presence of polyesters of the present invention, vulcanized to a remarkably high degree and the so vulcanized products appear to be highly reinforced.

The polyester concentration will depend on the particular type of polyester used, and generally may vary from about 0.5 to 50 parts per 100 parts of copolymer, more preferably, from about 2 to 20 parts per 100 parts of copolymer.

The examples reported in Table I above will further illustrate our invention. All parts are by weight unless otherwise stated.

A consideration of the foregoing data shows that the incorporation of our polyester plasticizer does in fact improve the dispersing of the filler, whereby an improved reinforcing effect is obtained. Thus, those examples wherein an appropriate polyester is incorporated (Examples 6–17) show a distinctly higher modulus than the control examples (Examples 1–5) wherein no polyester is present.

Variation can be made without departing from the spirit of our invention.

Having thus described our invention what we desire to secure and hereby claim by Letters Patent is:

1. A vulcanizable mixture comprising a copolymer of ethylene with an alpha-olefin selected from the group consisting of propylene and butene, an organic peroxide, and a polyester formed by condensation of at least one dicarboxylic acid containing at least one ethylenic double bond with a polyhydric alcohol.

2. The mixture of claim 1, wherein said alpha-olefin is propylene.

3. The mixture of claim 1, wherein said alpha-olefin is butene.

4. The mixture of claim 1, wherein the amount of polyester is from about 0.5 to 50% by weight, based on the copolymer.

5. The mixture of claim 1, wherein the dicarboxylic acid is itaconic acid.

6. The mixture of claim 1, wherein the dicarboxylic acid is maleic acid.

7. The mixture of claim 1, wherein at least two dicarboxylic acids, each having at least one ethylenic double bond, are condensed with said polyhydric alcohol.

8. The mixture of claim 1, wherein said polyester contains, in addition to an unsaturated dicarboxylic acid, a saturated dicarboxylic acid, said mixture containing at least one monomeric unit of unsaturated carboxylic acid per molecule of polyester.

9. The mixture of claim 1, wherein said polyester has a softening point below 180° C.

10. The mixture of claim 1, said mixture also containing a free radical acceptor selected from the group consisting of sulfur and quinonic compounds.

11. The mixture of claim 1, said mixture also containing a filler, said polyester serving as a promoter of the dispersion of said filler in the copolymer mass.

12. The shaped vulcanizate of the mixture of claim 1.

References Cited by the Examiner

UNITED STATES PATENTS

| | | | |
|---|---|---|---|
| 2,155,590 | 4/1939 | Garvey | 260—873 |
| 2,255,313 | 9/1941 | Ellis | 260—872 |
| 2,426,994 | 9/1947 | Frosch | 260—75 |
| 2,938,012 | 5/1960 | Filar | 260—88.2 |

OTHER REFERENCES

Garvey et al., Ind. & Eng. Chem., Aug. 1941, page 1062.

WILLIAM H. SHORT, *Primary Examiner.*